(12) United States Patent
Spude et al.

(10) Patent No.: US 8,632,332 B2
(45) Date of Patent: Jan. 21, 2014

(54) VERTICAL CONCRETE FORM WITH REMOVABLE FORMING PANELS

(75) Inventors: Gerald T. Spude, Brussels, WI (US); Steven T. Huff, Leesburg, VA (US); Bryan L. Danner, Fond du Lac, WI (US)

(73) Assignee: TF Forming Systems, Inc., Green Bay, WI (US)

( * ) Notice: Subject to any disclaimer, the term of this patent is extended or adjusted under 35 U.S.C. 154(b) by 1121 days.

(21) Appl. No.: 12/556,893

(22) Filed: Sep. 10, 2009

(65) Prior Publication Data
US 2011/0057090 A1   Mar. 10, 2011

(51) Int. Cl.
*E04B 2/86* (2006.01)
*E04G 11/06* (2006.01)

(52) U.S. Cl.
CPC ............. *E04B 2/8652* (2013.01); *E04G 11/06* (2013.01)
USPC ................. 425/425; 52/434; 52/442; 249/41; 249/45

(58) Field of Classification Search
USPC ........ 52/426, 442, 425, 434, 435; 249/38, 39, 249/40, 41, 42, 43, 44, 45
See application file for complete search history.

(56) References Cited

U.S. PATENT DOCUMENTS

| | | | | |
|---|---|---|---|---|
| 904,588 | A * | 11/1908 | Wightman | 52/426 |
| 963,776 | A * | 7/1910 | Kosacke | 52/426 |
| 2,242,730 | A * | 5/1941 | Sarosdy | 249/39 |
| 3,844,522 | A * | 10/1974 | Cochran | 249/19 |
| 4,211,385 | A * | 7/1980 | Johanson et al. | 249/192 |
| 4,463,926 | A * | 8/1984 | Bomberger | 249/47 |
| 4,841,707 | A * | 6/1989 | Novoa | 52/426 |
| 4,888,931 | A * | 12/1989 | Meilleur | 52/426 |
| 5,611,182 | A | 3/1997 | Spude | |
| 5,649,401 | A * | 7/1997 | Harrington, Jr. | 52/426 |
| 5,692,356 | A * | 12/1997 | Baxter | 52/309.11 |
| 5,809,726 | A | 9/1998 | Spude | |
| 5,987,830 | A * | 11/1999 | Worley | 52/309.11 |
| 5,992,114 | A * | 11/1999 | Zelinsky et al. | 52/426 |
| 6,026,620 | A | 2/2000 | Spude | |
| 6,134,861 | A | 10/2000 | Spude | |
| 6,250,033 | B1 * | 6/2001 | Zelinsky | 52/275 |
| 6,438,917 | B2 * | 8/2002 | Kubica | 52/426 |
| 6,698,710 | B1 | 3/2004 | VanderWerf | |
| 2005/0016083 | A1 | 1/2005 | Morin et al. | |
| 2008/0271401 | A1 * | 11/2008 | Grypeos | 52/426 |

FOREIGN PATENT DOCUMENTS

WO    9200433        1/1992
WO    2008149543 A1  12/2008

* cited by examiner

*Primary Examiner* — Michael Safavi
(74) *Attorney, Agent, or Firm* — Ziolkowski Patent Solutions Group, SC

(57) ABSTRACT

A construction form system for forming concrete walls for use as above grade walls, foundations, frost walls, exterior envelopes, and the like, is disclosed. The system includes a plurality of pairs of opposing vertical forming panels spaced from each other to define a forming cavity disposed to receive a hardenable material. Each pair of opposing forming panels comprises an inner panel forming part of an inner wall and an outer panel forming part of an outer wall. The system also includes an outer rail positioned between each adjacent pair of outer forming panels and an inner rail positioned between each adjacent pair of inner forming panels. The inner forming panels comprise support panels configured to be selectively addable and removable from between each adjacent pair of inner rails prior to and subsequent to a pouring of the hardenable material into the cavity.

23 Claims, 13 Drawing Sheets

VERTICAL CONCRETE FORM WITH REMOVABLE FORMING PANELS

BACKGROUND OF THE INVENTION

Embodiments of the invention relate generally to building construction form systems and, more particularly, to a high strength, adjustable construction form system for forming concrete walls for use as above grade walls, foundations, frost walls, exterior envelopes, and the like.

Concrete walls for use in foundations, above grade walls, and the like have typically been constructed using expensive reusable forms. In such systems, the forms maintain their proper position by a combination of metal tie plates between adjacent forms and metal tie rods between opposing forms. Such tie systems hold the forms in place during the assembly of the forming system and resist the movement of the forms from their proper alignment positions when concrete or other hardenable materials are poured and worked between the forms. After the concrete or other materials are hardened and at least partially cured, the conventional forms are typically removed from the structures and reused in other installations. These reusable forms, however, have typically been heavy and extremely labor-intensive to assemble.

Various other form systems have been proposed to reduce construction expense. These systems typically reduce labor costs and expense through the use of light and inexpensive materials that can be left in place after concrete or other building materials are poured into the form system. For example, insulating concrete forms, or "ICF" systems, are forming systems that utilize pre-formed, expanded polymeric foam forms. The blocks and panels of the ICF are retained as permanent or semi-permanent components of the completed structure.

Although effective, ICF systems are not without drawbacks. Existing ICF system designs require parts that are formed by injection molding, which is an expensive process requiring expensive tooling. Injection molding has also limited the practical length of the parts that can be produced to around nine feet. These relatively short lengths increase labor costs by increasing the number of connections required in the assembly process. Additionally, previous designs have generally required complex shapes and relatively complex assembly procedures. This complexity increased training costs and decreased efficiency while workers learned to use the system. Further, this complexity increased tooling costs.

Existing ICF systems also have been prone to form failure, commonly referred to as "bulging" or "blowout." That is, the foam insulation used to hold the poured concrete in place may fail due to the pressures exerted thereon, thereby allowing the concrete to distort or escape from the form system. The potential for such failures can lead to the use of additional external bracing in the ICF system that later must be removed, leading to increases in construction time and cost.

It would therefore be desirable to provide a form system having improved structural strength. It would be further desirable to provide a form system that can be efficiently assembled, reduces the need for customized form components, and that reduces time and cost associated with training and installation.

BRIEF DESCRIPTION OF THE INVENTION

Embodiments of the invention provide a construction form system for forming concrete walls for use as above grade walls, foundations, frost walls, exterior envelopes, and the like.

In accordance with one aspect of the invention, a system for forming a wall structure includes a plurality of pairs of opposing vertical forming panels spaced from each other to define a forming cavity disposed to receive a hardenable material, wherein each pair of opposing forming panels comprises an inner panel forming part of an inner wall and an outer panel forming part of an outer wall. The system also includes an outer rail positioned between each adjacent pair of outer forming panels and an inner rail positioned between each adjacent pair of inner forming panels. The inner forming panels comprise support panels configured to be selectively addable and removable from between each adjacent pair of inner rails prior to and subsequent to a pouring of the hardenable material into the cavity.

In accordance with another aspect of the invention, a vertical form system includes a plurality of pairs of opposing vertical forming panels spaced from each other to define a forming cavity disposed to receive a hardenable material, wherein each pair of opposing forming panels comprises an inner panel forming part of an inner wall and an outer panel forming part of an outer wall. The vertical form system also includes an outer rail positioned between each adjacent pair of outer forming panels and an inner rail positioned between each adjacent pair of inner forming panels. The inner forming panels comprise support panels, with each of the support panels having a center reinforcement section and an attachment section formed on each side of the center reinforcement section. The attachment sections are configured to selectively mate with the inner rail such that the support panel can be selectively added to and removed from the inner rail.

In accordance with yet another aspect of the invention, a system for forming a wall structure includes a plurality of pairs of opposing vertical forming panels spaced from each other to define a forming cavity disposed to receive a hardenable material, wherein each pair of opposing forming panels comprises an inner panel forming part of an inner wall and an outer panel forming part of an outer wall. The system also includes an outer rail positioned between each adjacent pair of outer forming panels, with the outer rail having a center wall and a plurality of flanges extending outwardly from the center wall to define a pair of panel channels. The system further includes an inner rail positioned between each adjacent pair of inner forming panels, the inner rail having a center wall and a plurality of flanges extending outwardly from the center wall to define a pair of panel channels and to define a support channel.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION OF THE PREFERRED EMBODIMENT

Figure 1A:
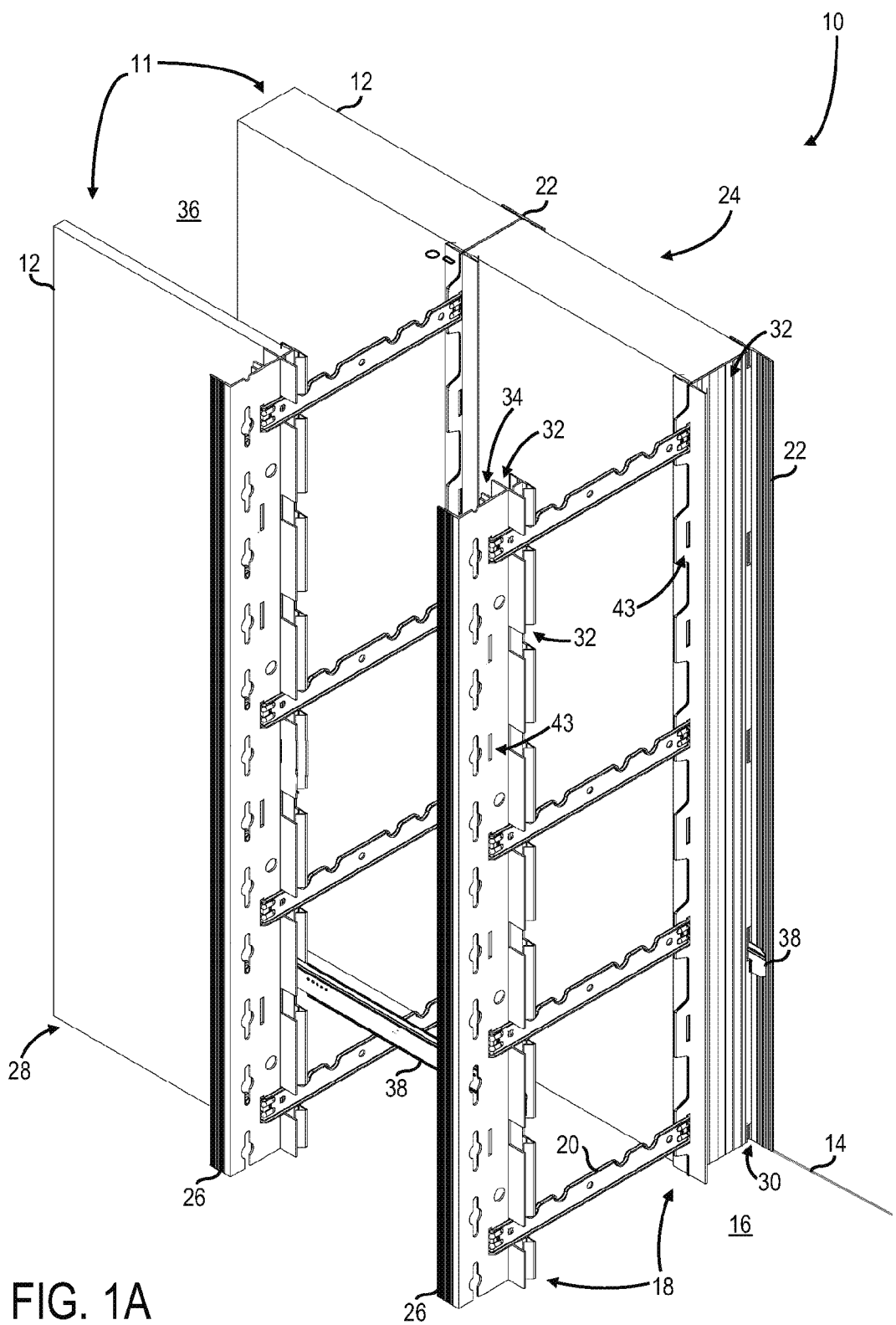
FIGS. 1A and 1B are perspective views of a vertically oriented building form system according embodiments of the invention.
Figure 1B:
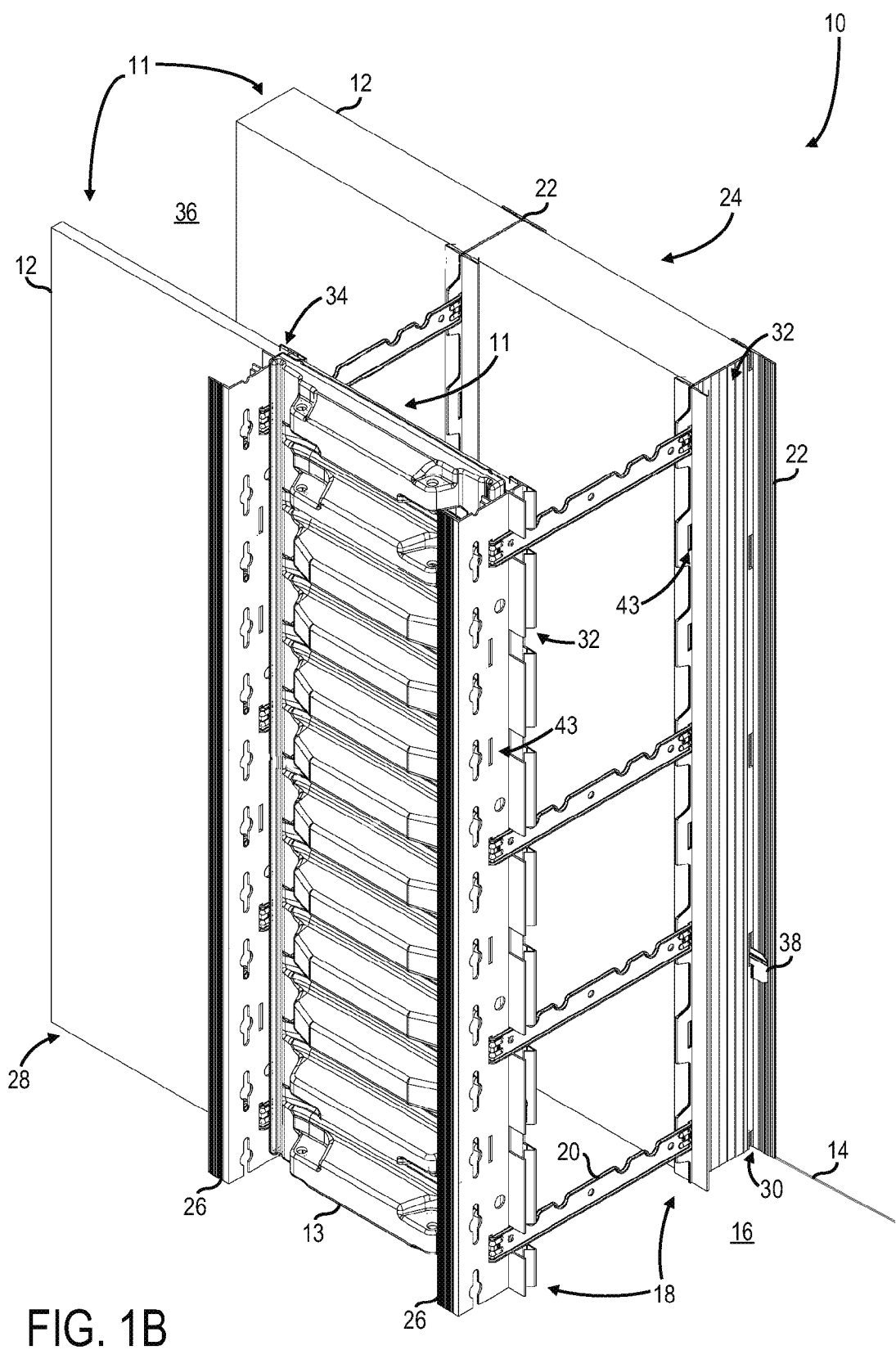

Referring to the drawings, a building form system 10 is shown in FIGS. 1A and 1B according to embodiments of the invention. The form system 10 is useful in construction and provides a form or mold for retaining concrete or other similar building materials until they harden to form a structural panel, foundation or the like. According to the embodiment of FIG. 1, the form system 10 provides two spaced, substantially parallel and substantially vertically oriented forming panels 11 between which concrete or other building material can be poured to form a structural member. According to embodiments of the invention, forming panels 11 can include insulating panels 12 and/or plastic support panels 13. It is envisioned that, according to embodiments of the invention, the forming panels 11 implemented by form system 10 may be in the form of both insulating panels 12 and plastic support panels 13, strictly insulating panels 12, or strictly plastic support panels 13. According to the embodiments of FIGS. 1A and 1B, the form system 10 includes a plurality of vertically oriented insulating panels 12 formed of a rigid, lightweight, inexpensive material such as expanded or extruded polystyrene foam (i.e., EPS or XPS) or, alternatively, of a "green" material such as a soy based foam or the like. Form system 10 also includes a bottom strip 14 set on a footing 16 for aligning insulating panels 12 thereon in a desired layout of a wall, a plurality of elongated rail members 18 for aligning and securing the insulating panels 12, and a plurality of cross-ties 20 that secure rail members 18 on opposing sides of the form system 10.

As shown in FIG. 1, the rail members 18 include a plurality of outer tie rails 22 (i.e., outer rails) that align insulating panels 12 to form an outer panel wall 24 and a plurality of inner tie rails 26 (i.e., inner rails) that align insulating panels 12 to form an inner panel wall 28. According to an exemplary embodiment, the outer rails 22 include a slot 30 formed at a bottom end thereof to receive bottom strip 14, such that outer rails 22 and insulating panels 12 can be aligned according to a desired layout of outer panel wall. Each of the outer rails 22 and the inner rails 26 are also constructed to define channels 32 therein configured to receive and secure insulating panels 12. The openings of the channels 32 in each of the outer rails 22 and the inner rails 26 are generally disposed in opposing directions to receive at least a portion of a side, edge or border of adjacent insulating panels 12.

According to an exemplary embodiment, the channels 32 formed in outer rail 22 have a width greater than that of the channels 32 formed in inner rail 26. The increased width of channels 32 in outer rail 22 allows for placement of an insulating panel 12 therein having a corresponding increased thickness, thereby forming an outer panel wall 24 with higher insulating properties than inner panel wall 28. That is, as the outer panel wall 24 includes insulating panels 12 having an increased thickness, the outer panel wall 24 therefore has an increased R value and thus provides improved thermal mass benefits. As the majority of insulation in form system 10 is desired in outer panel wall 24, the increased thickness of insulating panels 12 placed in channels 32 of outer rail 22 allows for formation of an inner panel wall 28 having decreased insulating properties. According to an embodiment of the invention, when insulating panels 12 forming outer panel wall 24 have an increased thickness, inner panel wall 28 could be formed of insulating panels 12 having a decreased thickness or of panels formed of a non-insulating material if desired. According to another embodiment, the inner panel wall 28 could be formed from only support panels 13, without the use of any insulating panels 12.

Referring to FIG. 1B, according to an embodiment of the invention, inner rails 26 are constructed to define a separate channel 34 therein to receive a support panel 13. Channel 34 is spaced outwardly from channel 32 in inner rail 26 away from the wall to be formed. A support panel 13 is inserted into channel 34 between adjacent pairs of inner rails 26 by slidingly engaging panel 13 into channels 34, thereby further strengthening form system 10 during pouring of concrete or other hardenable materials therein. According to an exemplary embodiment, support panel 13 is formed of a hollow plastic shell having a filler material (e.g., foam) included therein. Support panel 13 provides additional structural strength/integrity to form system 10 during a pouring of concrete therein by providing a rigid backing to insulating panels 12. Beneficially, support panels 13 can be removed (i.e., slid out, slidingly disengaged) from channels 34 once a pouring operation is complete and the concrete has set or cured, thereby providing an open space in channel 34 for routing electrical wiring and the like, as will be explained in greater detail below.

To provide further structural integrity to form system 10 during pouring of a wall, each of the outer rails 22 and the inner rails 26 is configured to receive and mate with cross-ties 20. The cross-ties 20 are connected between the outer rails 22 and the inner rails 26 at ninety degree angles to retain the outer and inner rails 26, as well as the insulating panels 12, in a spaced-apart relationship to allow flow of the hardenable liquid building material (e.g., concrete) between the insulating panels 12. Connecting the cross-ties 20 at ninety degree prevents longitudinal shifting as well as compression or expansion of the spaced-apart relationship of the insulating panels 12, thereby ensuring the dimensional integrity of the resulting structure. A plurality of cross-ties 20 are connected between each corresponding outer rail 22 and inner rail 26 and are spaced apart vertically along a length of the rails. Beneficially, as the cross-ties 20 are a separate component from the outer rails 22 and the inner rails 26, a desired number of cross-ties 20 can be connected between each corresponding outer rail 22 and inner rail 26 based on design considerations of the intended concrete wall, and the accompanying form system 10 needed to support pouring of the intended concrete wall.

The formation of cross-ties 20 as a separate component from the outer rails 22 and the inner rails 26 also allows for formation of a cavity 36 of a desired width for receiving poured concrete and forming a wall of a desired thickness. That is, a varied array of cross-ties 20 can be manufactured according to a number of pre-determined lengths and, based on design requirements of a wall to be manufactured, cross-ties 20 can be chosen to meet the design requirements. Cross-ties 20 having a desired length can then easily be implemented to space the outer rails 22 and the inner rails 26 (and insulating panels 12) to accommodate formation of walls having a requisite thickness.

As shown in FIGS. 1A and 1B, each of the outer rails 22 and the inner rails 26 is further configured to receive and mate with lateral braces 38 that provide further structural support to form system 10. Lateral braces 38 are connected between adjacent pairs of outer rails 22 and/or between adjacent pairs of inner rails 26. A plurality of lateral braces 38 are connected between adjacent pairs of outer rails 22 and/or between adjacent pairs of inner rails 26 and, similar to cross-ties 20, are spaced apart vertically along a length of the rails. Thus, a desired number of lateral braces 38 can be attached between adjacent pairs of outer rails 22 and/or between adjacent pairs of inner rails 26 based on design considerations of the intended concrete wall.

The selective attachment of a desired number of cross-ties 20 and lateral braces 38 to and between outer rails 22 and inner rails 26 allows for a varied amount of structural bracing to be designed into form system 10 to meet design considerations and prevent bulging or "blow-outs" of the form system. Additionally, the selective attachment of a desired number of cross-ties 20 and lateral braces 38 in form system 10 allows for a faster pour rate of concrete into cavity 36, taller pours of concrete, and the like. Because of the flexibility provided by cross-ties 20 and lateral braces 38, form system 10 does not require additional exterior bracing, saving a significant amount of work effort and material compared to prior art form systems which require vertical bracing at regular intervals to prevent bulging or "blow-outs" of the form system. In addition, workers have limited functions to perform outside the form system 10, enabling a substantial reduction in the conventional four-foot working space typically dug outside foundation walls. Accordingly, much less backfilling is required and backfilling operations can take place before concrete or other hardenable liquid building materials are poured into the form system 10, enabling greater flexibility in scheduling the backfilling operation, expediting the construction process, and lowering costs.

In construction of the form system 10, bottom strip 14 is routed along footing 16 in a desired layout of outer panel wall 24. An outer rail 22 is engaged with strip 14 via slots 30, and insulating panels 12 are then inserted into channels 32 of outer rail 22. Lateral braces 38 are secured to the outer rail 22 and additional outer rails 22 are engaged with strip 14 (via slots) and secured to the lateral braces. Inner rails 26 corresponding to the engaged outer rails 22 are then placed a pre-determined distance from outer rails 22, such that a cavity 36 of a desired width is formed. Cross-ties 20 having a length matching that or the desired cavity width are then secured between outer rails 22 and inner rails 26. A plurality of cross-ties 20 are connected between each corresponding outer rail 22 and inner rail 26 and are spaced apart vertically along a length of the rails, with the exact number of cross-ties being based on design considerations of the form system 10. Support panels 13 are then inserted into channels 34 between adjacent pairs of inner rails 26 to further strengthen form system 10 to accommodate a pouring of concrete or other hardenable materials therein.

Construction of form system 10 continues with a next insulating panel 12 being aligned with the insulating panels 12 of outer/inner panel walls 24, 28 already in place. Additional insulating panels 12 are attached to the panel 60 as described above, and the attachment of additional panels can be repeated, as shown in FIG. 1, until a desired length of form system 10 is achieved. Once form system 10 has been assembled, hardenable liquid building material (preferably concrete) can be poured into cavity 36. After the concrete hardens, a solid structure is formed. According to an embodiment of the invention, drywall or other building material can then be connected to the inner rails 26 using drywall screws or other conventional means.

While the embodiments of form system 10 shown in FIGS. 1A and 1B is described as including outer and inner rails 22, 26, it is also envisioned that the system 10 could be implemented with only outer rails 22 used to form each of the outer/inner panel walls 24, 28, or could be implemented with only inner rails 26 used to form each of the outer/inner panel walls 24, 28. As each of the outer and inner rails 22, 26 include channels 32 therein for receiving insulating panels 12 and are configured to receive and mate with cross-ties 20, outer and inner rails 22, 26 can be interchanged with one another according to desired design considerations of form system 10. The flexibility of form system 10 regarding the use of outer and inner rails 22, 26 allows for variations in the placement/ use of insulating panels 12 to meet desired maximum or minimum insulation values (i.e., R values) for the outer/inner panel walls 24, 28. For example, according to one embodiment of the invention, insulating panels 12 having an increased thickness could be used to form outer panel wall 24, while only support panels 13 could be used to form inner panel wall 28, without the use/placement of any insulating panels 12 in the inner panel wall.

Figure 2:
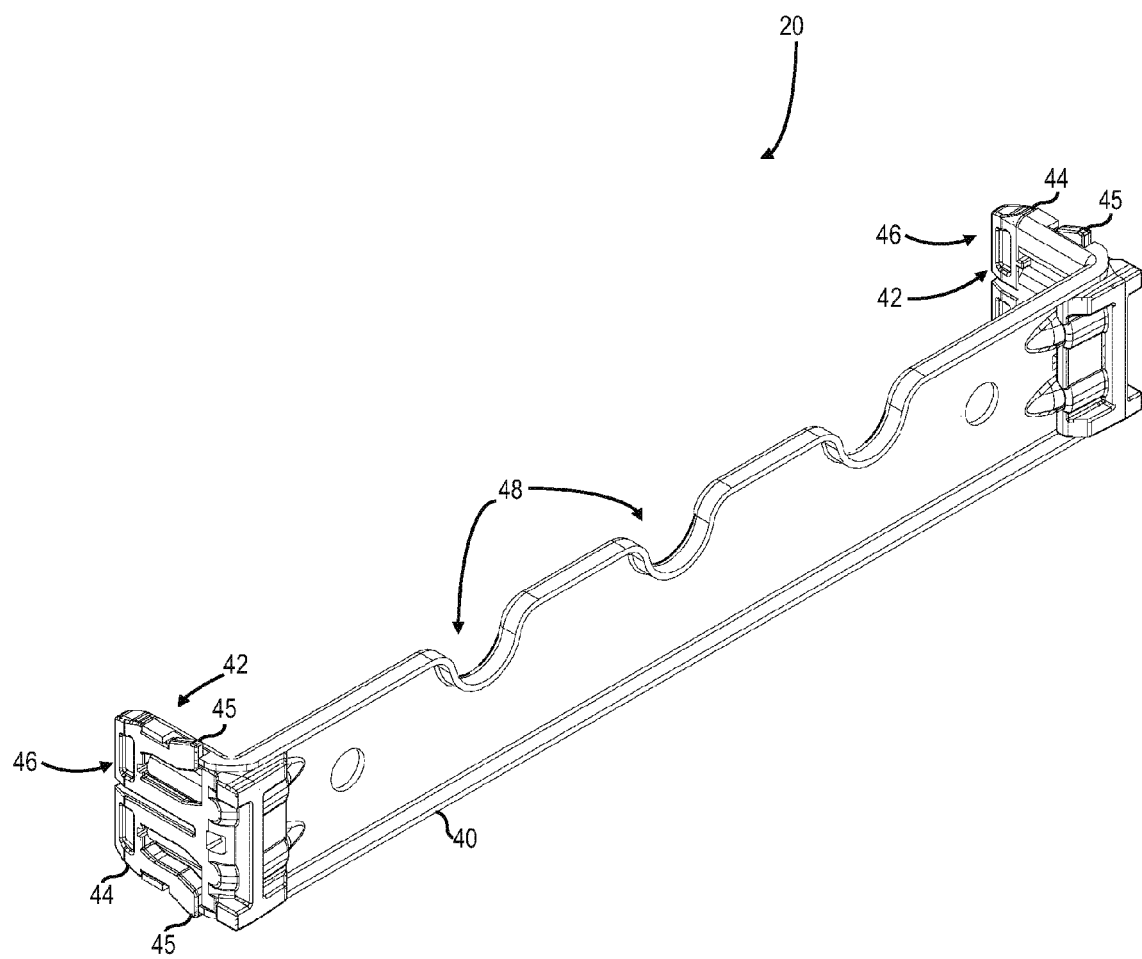
FIG. 2 is a detailed view of a cross-tie for use with the form system of FIGS. 1A and 1B.

Referring now to FIG. 2, and with continued reference to FIGS. 1A and 1B, a detailed view of cross-tie 20 is shown according to an embodiment of the invention. According to an embodiment of the invention, cross-tie 20 is formed of steel and includes a body length 40 and an end section 42 formed on each side of the body length. The body length 40 extends between an outer rail 22 and a respective inner rail 26 in a direction transverse to insulating panels 12. As set forth above, cross-tie 20 is formed as a separate component from outer rail 22 and inner rail 26 and can be manufactured according to one of a number of pre-determined lengths. Thus, body length 40 can be formed so as to have any one of a number of pre-determined lengths to allow for a variable spacing between outer rail 22 and inner rail 26, thereby providing a chosen width of cavity 36 for receiving poured concrete and forming a wall of a desired thickness.

As shown in FIG. 2, the end sections 42 of cross-tie 20 are oriented perpendicular to body length 40 and, according to an exemplary embodiment, are formed to have a U-shaped cross-section. End sections 42 are sized to engage receptacles 43 formed in outer rail 22 and inner rail 26 and each include thereon an end cap 44. End caps 44 are configured to slide onto/over end sections 42 of cross-tie 20 and include thereon an engagement mechanism 45 that provides for selective mating of the cross-tie 20 with the receptacles 43 to secure the end sections 42 therein. According to an exemplary embodiment, the end cap 44 is formed of a flexible polymer material and includes thereon a pair of spring tabs 45 formed on upper and lower surfaces of the end section 42 that form the engagement mechanism. The spring tabs 45 are positioned adjacent a distal end 46 of end section 42 and extend back toward body length 40 at an outward angle. When engaging end section 42 of cross-tie 20 to one of the outer/inner rail 22, 26, the spring tabs 45 first contact the rail at the distal end 46 of end section 42, thereby depressing the spring-tabs 45. Once the spring-tabs 45 have been pushed through the receptacle 43 in the outer/inner rail 22, 26, the spring-tabs 45 flex back outwardly to their original position to a spaced apart orientation that is greater than a height of receptacle 43, thereby locking end section 42 within the receptacle of outer/inner rail 22, 26 and securing the cross-tie 20 to the outer/inner rail 22, 26.

According to an exemplary embodiment, body length 40 of cross-tie 20 includes a plurality of reinforcement bar (or "rebar") holders 48 formed on an upward facing surface thereof. As shown in FIG. 2, rebar holders are formed as indents 48 that are sized to receive and hold rebar therein. Rebar can be routed in a parallel orientation within cavity 36 of form system 10 (FIG. 1) and laid within indents 48 of cross-ties 20 at an equal height (i.e., cross-ties attached to outer/inner rails 22, 26 at an equal vertical location) so as to be placed within the form system. When concrete or other hardenable material is then poured into cavity 36 of form system 10, rebar is maintained in a desired location by cross-tie indents 48. While shown as indents formed on an upward facing surface of body length 40, it is recognized that openings could be formed through body length 40 as an alternative feature for receiving rebar.

Figure 3:
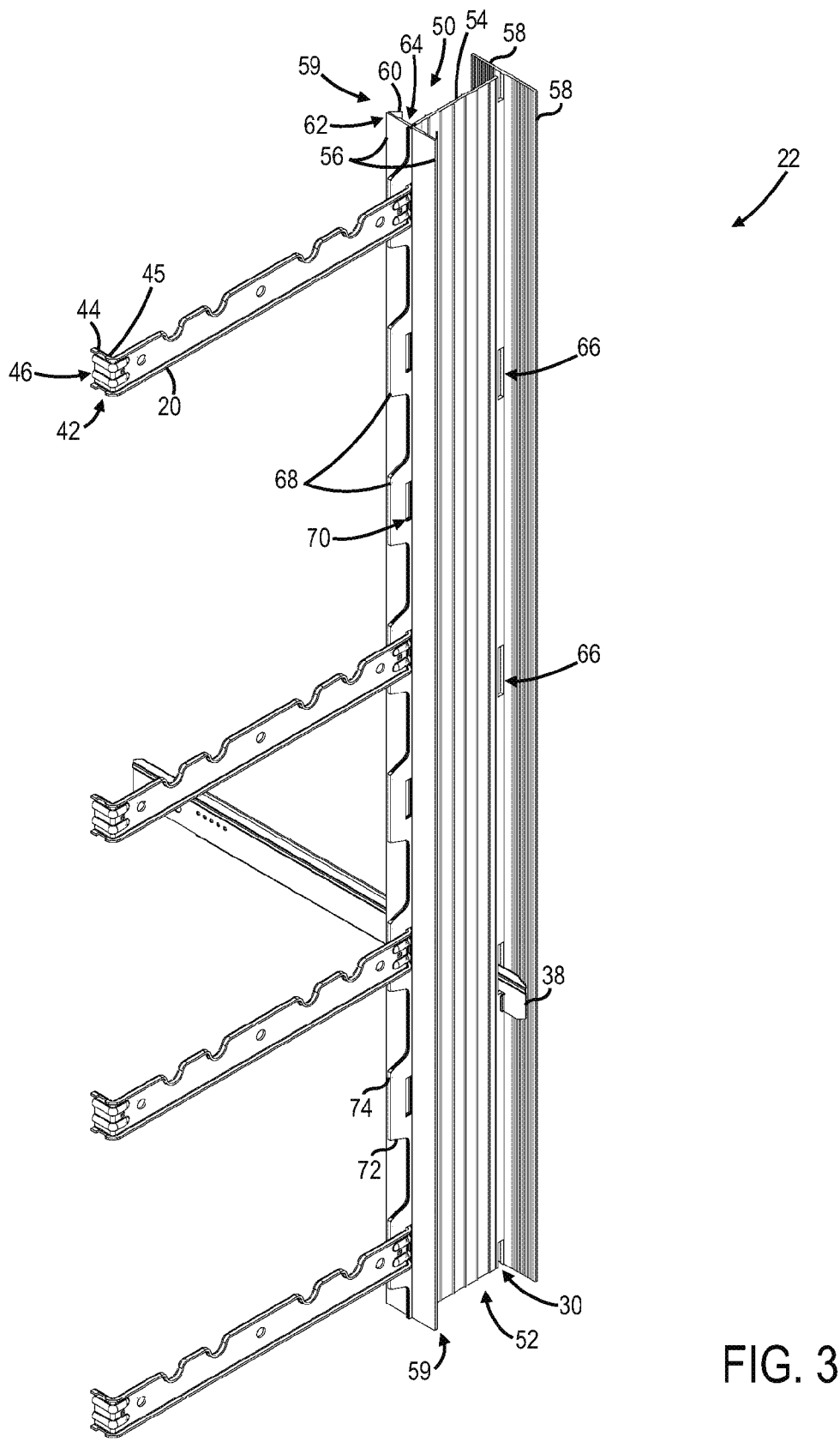
FIG. 3 is a detailed view of an outer rail for use with the form system of FIGS. 1A and 1B.

Referring now to FIG. 3, a detailed view of outer rail 22 is shown according to an embodiment of the invention. Outer rail 22 is formed as an H-shaped rail having two channels 50, 52 defined by a center wall 54, and outwardly extending interior flanges 56 and exterior flanges 58, thus forming a retaining section 59 to receive insulating panels 12 (FIGS. 1A and 1B). The openings of the channels 50, 52 are generally disposed in opposing directions to receive at least a portion of a side, edge or border of adjacent insulating panels 12, such as shown in FIG. 1. As shown in FIG. 3, each of the interior flanges 56 has a panel tab 60 formed on end thereof extending inwardly into channels 50, 52. The panel tabs 60 are configured to allow for placement of insulating panels 12 into channels 50, 52 and to exert pressure on the panels to secure the panels within the channels. According to an exemplary embodiment of the invention, a portion 62 of interior flange 56 has a decreased thickness that is reduced by an amount equal to a thickness of panel tab 60. As such, upon placement of insulating panel 12 into channel 50, 52, panel tab 60 is pressed inward back toward interior flange 56 and mates therewith in portion 62 of reduced thickness such that an inward facing surface 64 of interior flange 56 is substantially flat or even.

As further shown in FIG. 3, outer rail 22 includes a slot 30 formed at a bottom end of center wall 54 adjacent exterior flanges 58 to receive bottom strip 14 (FIGS. 1A and 1B). Also formed in center wall 54 adjacent exterior flanges 58 are a plurality of slits 66 (i.e., lateral brace receptacles) spaced vertically along outer rail 22 and extending a length thereof. Slits 66 are sized to receive lateral braces 38 that can be attached between adjacent outer rails 22 in a direction parallel to insulating panels 12 to provide additional support to form system 10 (FIGS. 1A and 1B) during a pouring of concrete therein. As a plurality of slits 66 extend along the length of outer rail 22, a desired number of lateral braces 38 can be selectively attached between adjacent outer rails 22 based on design requirements of the intended concrete wall.

Outer rail 22 also includes thereon a plurality of attachment brackets 68 formed as part of the rail structure that are positioned in-line with center wall 54 and extend inwardly past interior flanges 56. Attachment brackets 68 are spaced vertically along outer rail 22 to extend a length thereof. As shown in FIG. 3, attachment brackets 68 are substantially U-shaped and include a cross-tie receptacle 70 therein adjacent interior flanges 56. Cross-tie receptacle 70 is sized to receive end section 42 and end cap 44 of cross-tie 20 therein to secure the cross-tie to outer rail 22. In securing the end section 42 of cross-tie 20 within cross-tie receptacle 70, spring tabs 45 of end cap 44 contact the bracket 68 at upper and lower points as the end section is pressed into cross-tie receptacle 70. The bracket 68 first contacts spring-tabs 45 at the distal end 46 of end section 42 and depresses the spring-tabs as they slide therealong. Once the spring-tabs 45 have been pushed through cross-tie receptacle 70, the spring-tabs 45 flex back outwardly to their original position to a spaced apart orientation that is greater than a height of cross-tie receptacle 70, thereby locking end section 42/end cap 44 of cross-tie 20 within the cross-tie receptacle 70 of bracket 68 and securing the cross-tie 20 to outer rail 22.

According to an exemplary embodiment of the invention, outer rail 22 has a hybrid structure with a portion formed of a polymer material and reinforcing sections formed of metal, such as steel for example. Center wall 54, interior flanges 56, and exterior flanges 58 are formed of an electrically insulating polymer material, such as polyvinyl chloride (PVC). Attachment brackets 68 are formed to have a hybrid structure to have improved structural integrity. An outer shell 72 of attachment bracket 68 is integrally formed with center wall 54 and is comprised of PVC. A reinforcement insert 74 is formed of steel, for example, and is inserted within the outer shell 72, surrounding cross-tie receptacle 70 to provide a high strength attachment for cross-tie 20. According to an exemplary embodiment, the hybrid structure outer rail 22 is formed by way of a co-extrusion process, thereby providing the greatest structural integrity between the steel and PVC materials of the outer rail.

Figure 4:
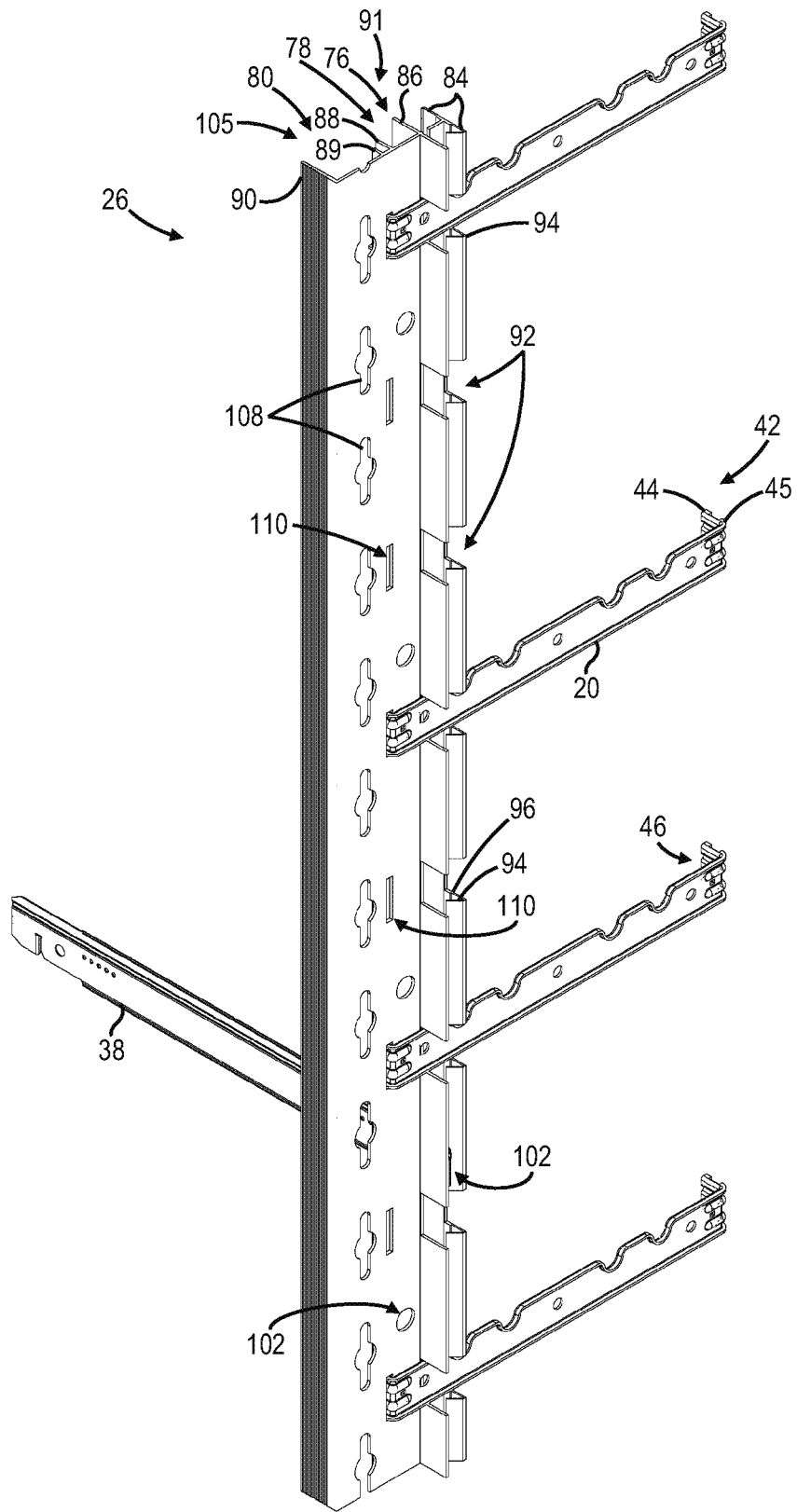
FIG. 4 is a detailed view of an inner rail for use with the form system of FIGS. 1A and 1B.

Referring now to FIG. 4, a detailed view of inner rail 26 is shown according to an embodiment of the invention. Inner rail 26 is constructed so as to have a plurality of distinct channels 76, 78, 80 formed therein. A center wall 82 extends a width of inner rail 26 and a plurality of outwardly extending flanges 84, 86, 88, 89, 90 are spaced along center wall 82 to define the plurality of channels 76, 78, 80. Included in the plurality of flanges are inner panel flanges 84 formed on an inward facing end (i.e., inward toward cavity 36 in the form of FIG. 1) of inner rail 26. The inner panel flanges 84 run a vertical length of inner rail 26 and extend outwardly in both directions from center wall 82. Outer panel flanges 86 are spaced outwardly from inner panel flanges 84 to define panel channels 76 and, along with center wall, form a retaining section 91 for receiving insulating panels 12 (FIGS. 1A and 1B). The outer panel flanges 86 run a vertical length of inner rail 26 and extend outwardly in both directions from center wall 82. The openings of the panel channels 76 are generally disposed in opposing directions to receive at least a portion of a side, edge or border of adjacent insulating panels 12, such as shown in FIGS. 1A and 1B. As shown in FIG. 4, an inner panel flange 84 and outer panel flange 86 on one side of center wall 82 include a plurality of notches 92 formed therein, such that the inner and outer flanges 84, 86 on that side of the center wall are discontinuous. Notches 92 are sized to allow a cross-tie 20 to extend through inner panel flange 84 and outer panel flange 86 for attachment to inner rail 26, as will be explained below. While inner panel flanges 84 and outer panel flanges 86 are shown as including notches 92 formed therein on only one side of center wall 82, it is recognized that notches 92 could be formed in inner panel flanges 84 and outer panel flanges 86 on both side of center wall 82.

As shown in FIG. 4, each of the inner panel flanges 84 includes a panel tab 94 formed on an end thereof extending into panel channel 76. The panel tab 94 is configured to allow for placement of insulating panel 12 (FIGS. 1A and 1B) into panel channel 76 and to exert pressure on the panel to secure it within the channel. According to an exemplary embodiment of the invention, a portion 96 of inner panel flange 84 has a decreased thickness that is reduced by an amount equal to a thickness of panel tab 94. As such, upon placement of an insulating panel 12 into panel channel 76, panel tab 94 is pressed inward back toward inner panel flange 84 and mates therewith in the portion 96 of reduced thickness, such that an inward facing surface 98 of inner panel flange 84 is substantially flat or even.

As further shown in FIG. 4, inner rail 26 also includes therein a plurality of slits 102 formed in center wall 82, adjacent to an outward facing surface of outer panel flange 86. The slits 102 are spaced vertically along inner rail 26 and are vertically aligned with each of the flange portions that make up the discontinuous/notched inner panel flange 84 and outer panel flange 86. Slits 102 are sized to receive lateral braces 38 that can be attached between adjacent inner rails 26 in a direction parallel to insulating panels 12 to provide additional support to form system 10 (FIGS. 1A and 1B) during a pouring of concrete therein. As a plurality of slits 102 extend along the length of inner rail 26, a desired number of lateral braces 38 can be selectively attached between adjacent inner rails 26 based on design requirements of the form system 10.

Retaining section 91 of inner rail 26 also includes a support flange 88 that is spaced outwardly from outer panel flanges 86 and that, along with one of the outer panel flanges 86, defines a support channel 78. As shown in FIG. 4, according to an exemplary embodiment, support flange 88 extends out from center wall 82 in one direction, on the same side of the center wall as the continuously formed outer panel flange 86. The support flange 88 is spaced outwardly from outer panel flange 86 a specified distance, such that support channel 78 is sized to receive at least a portion of a side, edge or border of a support panel 13, such as shown in FIG. 1B. Between support flange 88 and outer panel flanges 86, inner rail 26 includes electrical chases or passages 104 formed in center wall. One or more chases 104 are formed in center wall 82 in a vertically spaced arrangement and allow for the routing of electrical wiring therethrough. That is, subsequent to pouring and setting of concrete within form system 10, the support panel 13 (FIG. 1B) may be removed, thereby providing an open space within support channel 78 that allows for the routing of electrical wiring through electrical chases 104.

Referring still to FIG. 4, inner rail 26 includes an external flange 90 that is spaced outwardly from support flange 88 and that, along with a mounting channel flange 89 and center wall 82, forms a mounting section 105 that defines a stud cavity 80 (i.e., stud channel). External flange 90 extends out from center wall 82 in one direction, on the same side of center wall 82 as support flange 88. According to an exemplary embodiment, and as shown in FIG. 4, external flange 90 is formed as a ribbed or grooved flange. Grooves 106 formed on external flange 90 are configured to provide a surface for mounting components (not shown) thereon, such as an electrical box or the like. The mounting section 105 is sized to receive a strong back support beam or rail (not shown) to which scaffolding is mounted. To receive the strong back, anchor openings 108 are formed in center wall 82 in a vertically spaced arrangement. Anchor openings 108 may also serve as electrical chases or passages that are formed in center wall 82 in a vertically spaced arrangement and allow for the routing of electrical wiring therethrough and within stud cavity 80. As stud cavity 80 remains open upon pouring of concrete within form system 10 (i.e., no insulating/support panels are placed within the stud cavity), the stud cavity provides for the routing of electrical wiring therein through anchor openings 108.

To allow for attaching cross-ties 20 to inner rail 26, inner rail 26 also includes therein a plurality of cross-tie receptacles 110 formed in center wall 82, between support flange 88 and flange 89. Cross-tie receptacles 110 are vertically aligned with notches 92 formed in the inner panel flange 84 and outer panel flange 86 (on one side of center wall 82) and are sized to receive end section 42 and end cap 44 of cross-tie 20 therein, to allow for securing of cross-tie 20 to inner rail 26. In securing the end section 42 of cross-tie 20 within cross-tie receptacle 110, the spring tabs 45 of end cap contact the center wall 82 at upper and lower points of cross-tie receptacle 110 as the end section 42 is pressed into the cross-tie receptacle. The center wall 82 first contacts spring-tabs 45 at the distal end 46 of end section 42 and depresses the spring-tabs 45 as they slide therealong. Once the spring-tabs 45 have been pushed through cross-tie receptacle 110, the spring-tabs 45 flex back outwardly to their original position to a spaced apart orientation that is greater than a height of cross-tie receptacle 110, thereby locking end section 42/end cap 44 of cross-tie 20 within the cross-tie receptacle 110 of center wall 82 and securing the cross-tie 20 to inner rail 26.

Figure 5:
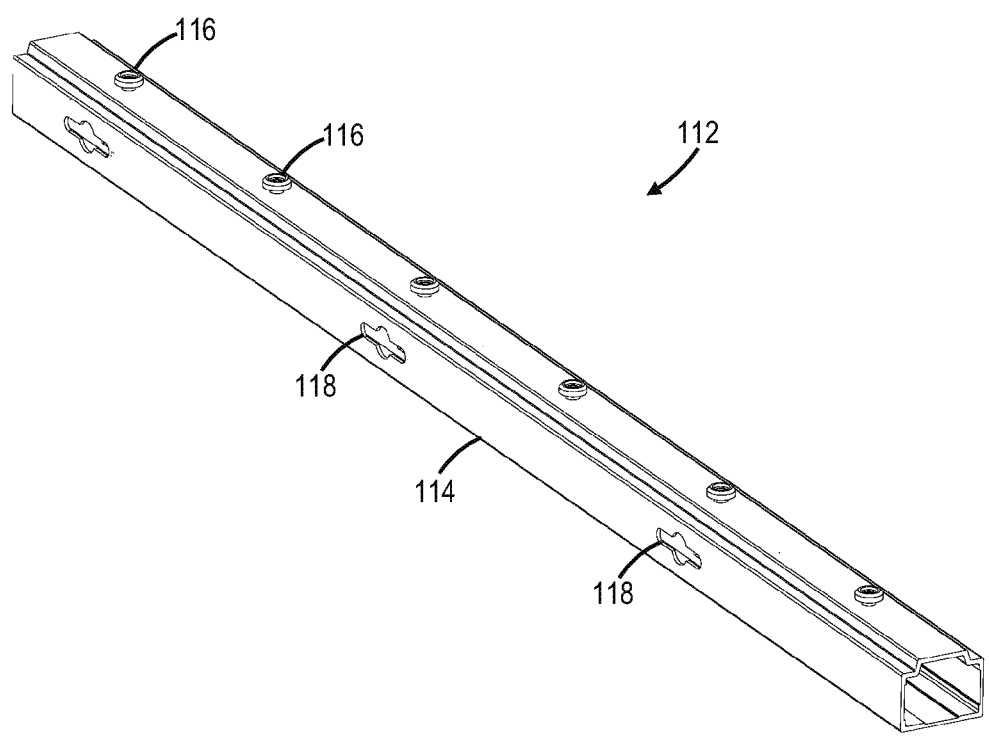
FIG. 5 is a perspective view of a strongback rail for use with the form system of FIGS. 1A and 1B.

Referring now to FIG. 5, a strongback rail 112 is shown configured to mate with mounting section 105 of inner rail 26 (FIG. 4). Strongback rail 112 is formed of a rail body 114 that includes a plurality of mounting studs 116 that are vertically spaced along the rail body. The mounting studs 116 are configured to mate with the plurality of anchor openings 108 that are formed in center wall 82 of inner rail 26 (FIG. 4), so as to secure strongback rail 112 to the inner rail 26. On a side of rail body 114 adjacent and/or opposite from mounting studs 116, an attachment mechanism 118 is included on strongback rail 112 that is configured to receive and secure a scaffolding system (not shown) to the strongback rail. According to an exemplary embodiment, the attachment mechanism 118 is in the form of a receptacle configured to receive a bolt (not shown) or similar type mounting device included on the scaffolding system.

Figure 6:
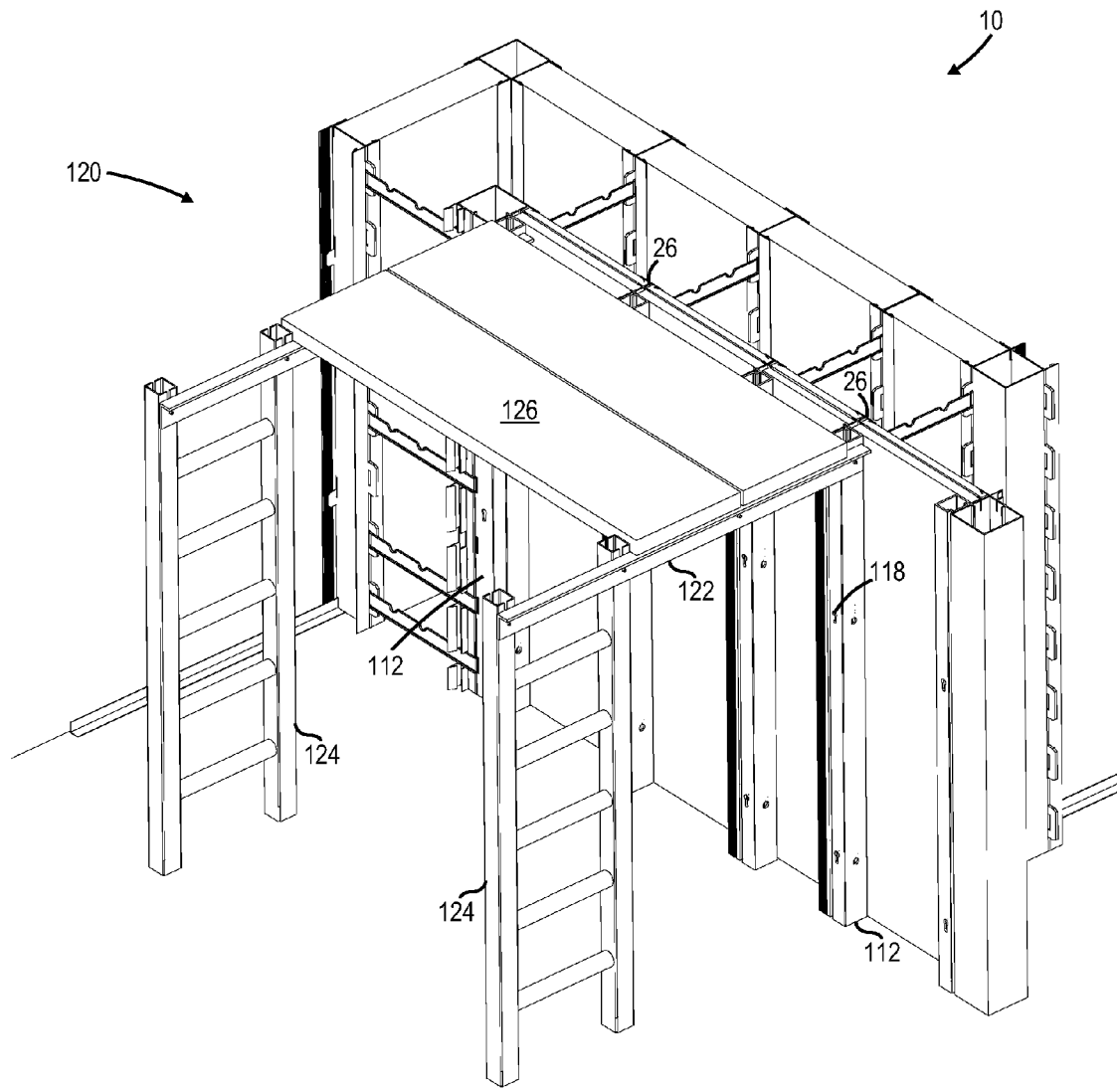
FIG. 6 is a perspective view of a scaffolding system integrated with the form system of FIGS. 1A and 1B.
Figure 7:
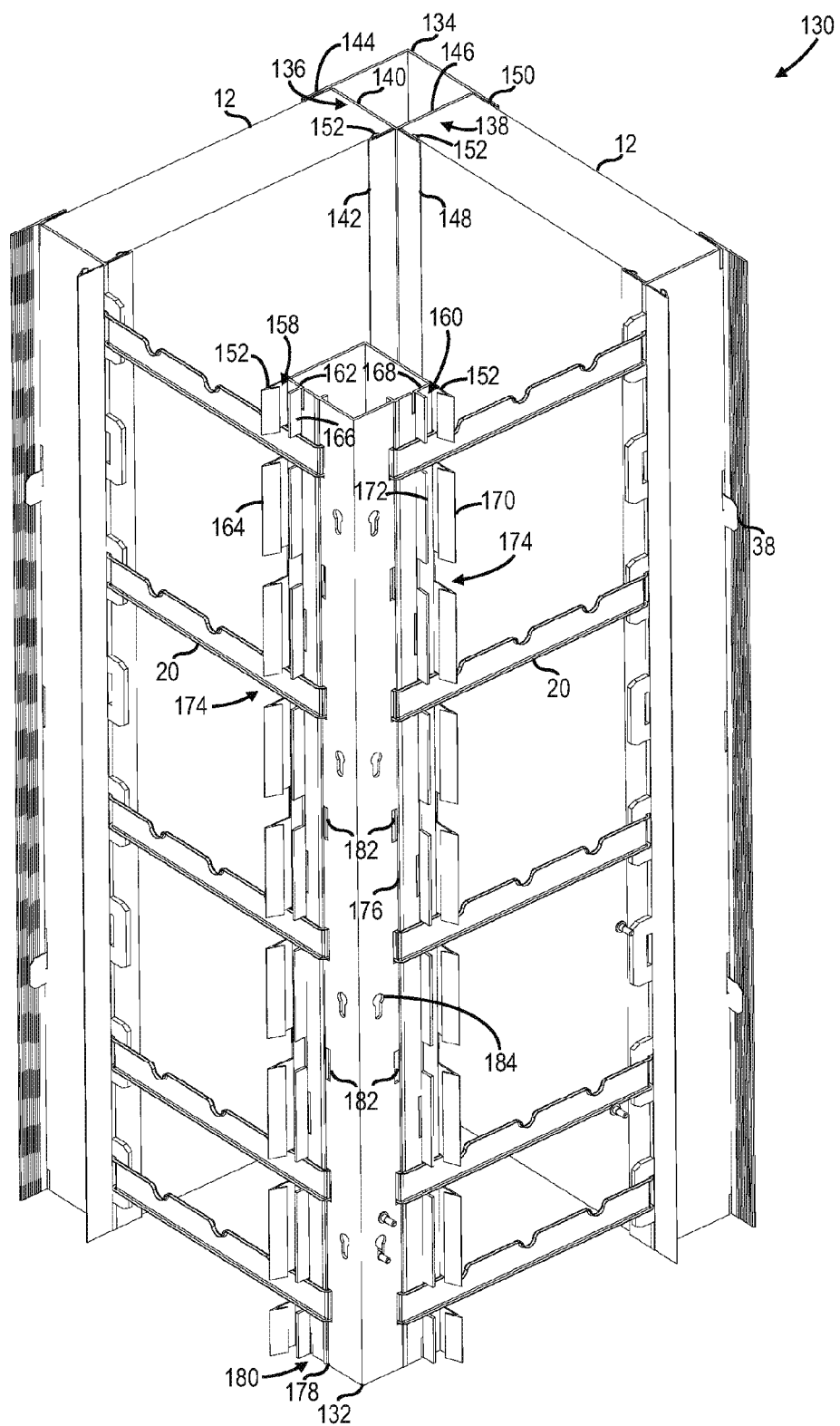
FIG. 7 is a perspective view of a corner assembly for use with the form system of FIGS. 1A and 1B.

Referring now to FIG. 6, a scaffolding system 120 is shown mounted onto form system 10, according to an embodiment of the invention. Scaffolding system 120 is supported in part by form system 10 by way of strongback rails 112. As shown in FIG. 7, a pair of strongback rails 112 is secured to desired inner rails 26 in form system 10 to provide support for scaffolding system 120. Support rails 122 included in scaffolding system 120 are secured to strongback rails 112 by way of attachment mechanism 118. As set forth above, according to an exemplary embodiment, attachment mechanism 118 on strongback rails 112 is configured as an opening that receives, for example, a stud (not shown) formed on attachment rail 122 or a bolt that passes through the attachment rail 122 and into the opening 118 on the strongback rail 112. Attached to an opposite end of attachment rails 122 are support ladders 124 of scaffolding system 120. Spanning a distance between attachment rails 122 is a support platform 126 (i.e., scaffold planks), which can be secured to attachment rails 122 in a known manner.

While scaffolding system 120 is shown in FIG. 6 as being attached to/supported by form system 10 by the use of a pair of strongback rails 112, it is envisioned that a greater number of strongback rails could be used for support. That is, additional strongback rails 112 could be attached to desired inner rails 26 (as set forth in FIG. 6) to provide for the connection and use of additional attachment rails 122 and support platforms 126 in scaffolding system 120.

Referring now to FIG. 7, a corner assembly 130 of form system 10 is shown according to an embodiment of the invention. Corner assembly 130 includes therein an inner corner rail 132 and an outer corner rail 134 that are configured to receive insulating panels 12 therein. Each of inner corner rail 132 and outer corner rail 134 are configured to receive an adjacent pair of insulating panels 12 and arrange the panels in a non-parallel orientation. While the inner corner rail 132 and outer corner rail 134 shown in FIG. 7 are configured to orient adjacent insulating panels 12 at a ninety degree angle, it is recognized that inner corner rail 132 and outer corner rail 134 can be configured to form corners for form system 10 that extend at angles less than ninety degrees and at angles greater than ninety degrees by suitable shaping of the inner corner rail 132 and outer corner rail 134.

As shown in the embodiment of FIG. 7, outer corner rail 134 includes channels 136, 138 formed therein having openings disposed in a perpendicular relationship. Channel 136 is defined by a first back wall 140, a first interior flange 142, and a first exterior flange 144. Channel 138 is defined by a second back wall 146, a second interior flange 148, and a second exterior flange 150, each of which are oriented ninety degrees from first back wall 140, first interior flange 142, and first exterior flange 144. According to an exemplary embodiment, each of the first and second interior flanges 142, 148 has a panel tab 152 formed on an end thereof extending inwardly into channels 136, 138. The panel tabs 152 are configured to allow for placement of insulating panels 12 into channels 136, 138 and to exert pressure thereon to secure the panels in the channels.

Outer corner rail 134 also includes a pair of slots (not shown) formed at a bottom end of back walls 140, 146 and adjacent exterior flanges 144, 150 to receive bottom strip 14 (FIGS. 1A and 1B). Also formed in back walls 140, 146 and adjacent exterior flanges 144, 150 are a plurality of slits (not shown) spaced vertically along outer corner rail 134 and extending a length thereof. Slits are sized to receive lateral braces 38 (FIG. 1) that can be attached between outer corner rail 134 and adjacent outer rails 22 in a direction parallel to insulating panels 12 to provide additional support to form system 10 during a pouring of concrete into cavity 36.

Similar to outer corner rail 134, inner corner rail 132 includes panel channels 158, 160 formed therein having openings disposed in a perpendicular relationship. Channel 158 is defined by a first back wall 162, a first interior flange 164, and a first exterior flange 166. Channel 160 is defined by a second back wall 168, a second interior flange 170, and a second exterior flange 172, each of which are oriented ninety degrees from first back wall 162, first interior flange 164, and first exterior flange 166. According to an exemplary embodiment, each of the first and second interior flanges 164, 170 has a panel tab 152 formed on an end thereof extending inwardly into channels 158, 160. The panel tabs 152 are configured to allow for placement of insulating panels 12 into channels 158, 160 and to exert pressure on the panels to them in the channels.

As shown in FIG. 7, each of first and second interior flanges 164, 170 and each of first and second exterior flanges 166, 172 include a plurality of notches 174 formed therein. Notches 174 are sized to allow a cross-tie 20 to extend through first interior and exterior flanges 164, 166 and a cross-tie 20 to extend through second interior and exterior flanges 170, 172 for attachment to inner corner rail 132. Inner corner rail 132 also includes therein a plurality of slits 176 formed in back walls 162, 168, adjacent to first and second exterior flanges 166, 172. The slits 176 are spaced vertically along inner corner rail 132 and are vertically aligned with each of the flange portions that make up the discontinuous interior flanges 164, 170 and exterior flanges 166, 172 having the notches 174 therein. Slits 176 are sized to receive lateral braces 38 (FIG. 1) that can be attached between inner corner rail 132 and adjacent inner rails 26 (FIG. 1) in a direction parallel to insulating panels 12 to provide additional support to form system 10 during a pouring of concrete into cavity 36.

Inner corner rail 132 also includes support flanges 178 extending out from back walls 162, 168 and that are spaced apart from first and second exterior flanges 166, 172. Support flanges 178, along with back walls 162, 168 and exterior flanges 166, 172, define support channels 180 configured to receive support panels 13 (FIG. 1B) therein. To allow for attaching cross-ties 20 to inner corner rail 132, inner corner rail 132 includes therein a plurality of cross-tie receptacles 182 formed in back walls 162, 168, adjacent to support flanges 178. Cross-tie receptacles 182 are vertically aligned with notches 174 formed in interior flanges 164, 170 and exterior flanges 166, 172, and are sized to receive end section 42 of cross-tie 20 therein. As shown in FIG. 7, back walls 162, 168 also include anchor openings 184 formed therein in a vertically spaced arrangement. Anchor openings 184 are configured to receive a strong back support beam/rail (not shown) to which scaffolding is mounted.

In forming corner assembly 130, insulating panels 12 are secured to outer corner rail 134 so as to extend out therefrom in a perpendicular relationship. Outer rails 22 are secured to an opposite end of insulating panels 12, as is described in detail with respect to FIG. 3. Upon placement of the outer rails 22 on insulating panels 12, the outer rails 22 are secured to inner corner rail 132 by way of cross-ties 20. Cross-ties 20 are secured within brackets 68 of outer rails 22 and are secured within cross-tie receptacles 182 in inner corner rail 132. Securing of outer corner rail 134 to outer rails 22, and of inner corner rail 132 to outer rails 22, thus forms a box-shaped corner assembly 130, from which outer and inner panel walls 24, 28 (FIG. 1) can be further formed extending in a perpendicular relationship, or in another angular relationship.

Figure 8:
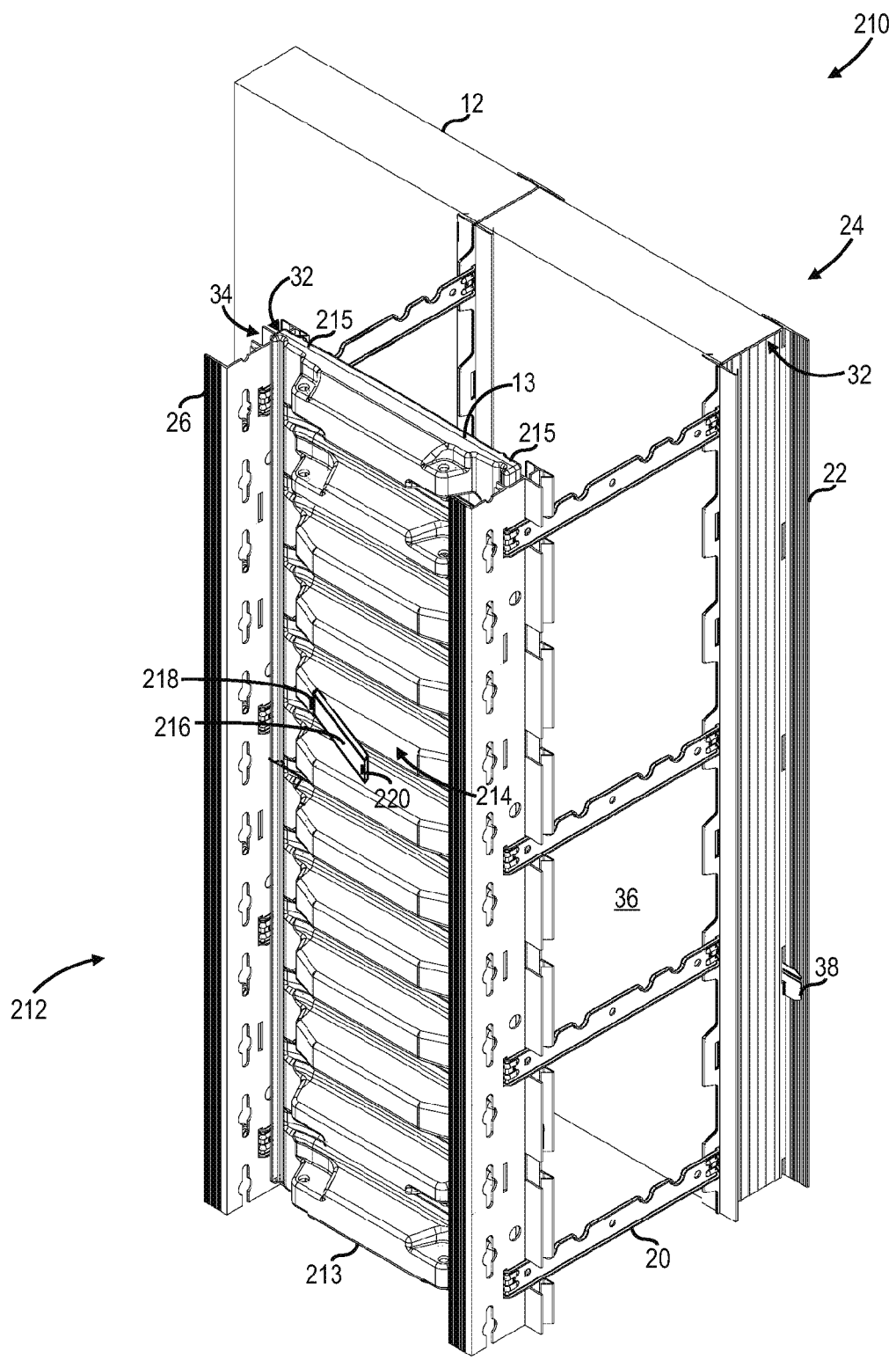
FIG. 8 is a perspective view of a vertically oriented building form system including removable support panels according to an embodiment of the invention.

Referring now to FIG. 8, a form system 210 is shown according to an embodiment of the invention, in which no insulating panels are used to form inner wall 212. According to the embodiment of FIG. 8, the form system 210 includes a plurality of outer rails 22 that align insulating panels 12 to form an outer panel wall 24 and a plurality of inner rails 26 that align support panels 13 to form an inner wall 212. Each of the outer rails 22 and the inner rails 26 are also constructed to define channels 32 therein configured to receive and secure insulating panels 12; however, insulating panels 12 are only positioned in channels 32 of outer rails 22. No insulating panels are placed in the channels 32 of inner rails 26.

To form inner panel wall 212, a plurality of support panels 13 is placed into channels 34 defined in inner rails 26. Channel 34 is spaced outwardly from channel 32 in inner rail 26 away from the wall to be formed. A support panel 13 is inserted into channel 34 between adjacent pairs of inner rails 26 to form inner panel wall 212. According to the embodiment of FIG. 8, support panel 13 is formed of a center reinforcement section 213 and attachment sections 215 on each side of the center reinforcement section 213. The center reinforcement section 213 has an increased thickness as compared to attachment sections 215, such that support panel 13 has an increased rigidity desired for pouring of concrete into form system 10 to reduce the chance of blowouts and bulging. According to an exemplary embodiment, center reinforcement section 213 is formed of an outer, hollow plastic shell having a filler material (e.g., foam) included therein to prevent flexing/distortion of the outer shell during a pour. The structure of center reinforcement section 213 thus provides for a lightweight support panel 13 that has adequate structural strength and integrity.

As shown in FIG. 8, center reinforcement section 213 includes therein an opening 214 extending therethrough, with a door 216 disposed in the opening. In an exemplary embodiment, the door 216 includes a hinge 218 formed thereon to provide for selective opening and closing of the door, thereby selectively exposing the opening 214 in support panel 13. A latch mechanism 220 is also included on door 216 to secure the door in a closed position when desired. When open, door 216 allows for a "side pour" of concrete or other hardenable material into cavity 36. That is, rather than pouring the entirety of the concrete from above the form system 210, which increases the forces and the amount of stress placed thereon, a portion of the concrete is first poured through opening 214 so as to reduce the amount of stress placed on the form system.

According to an embodiment of the invention, support panels 13 are configured to include a pattern (not shown) on one side thereof. That is, the side of support panels 13 facing into cavity 36 can include thereon one of any number of patterns, such as a brick-like pattern for example, that functions to pattern an interior surface of a wall formed by the poured concrete. Upon setting of the concrete, support panels 13 can be removed (i.e., slid out) from channels 34 to expose the patterned wall. Inner rails 26 are configured to include a break-apart portion such that once support panels 13 are removed, a portion of each of the inner rails 26 can be removed such that the inner rails do not extend out past the patterned concrete wall.

As form system 210 includes insulating panels 12 only as part of outer wall 24, it is desired that the insulating panels 12 of the outer wall 24 have an increased thickness. As such, according to the embodiment of FIG. 8, the channels 32 formed in outer rail 22 have a width greater than that of the channels 32 formed in inner rail 26. The increased width of channels 32 in outer rail 22 allows for placement of an insulating panel 12 therein having an increased thickness, thereby forming an outer panel wall 24 with improved insulating properties.

To provide further structural integrity to form system 10 during pouring of a wall, each of the outer rails 22 and the inner rails 26 is configured to receive and mate with cross-ties 20 and lateral ties 38. The cross-ties 20 are connected between the outer rails 22 and the inner rails 26 at ninety degree angles to retain the outer and inner rails 26, as well as the insulating panels 12, in a spaced-apart relationship to allow flow of the hardenable liquid building material (e.g., concrete) between the insulating panels 12. A plurality of cross-ties 20 are connected between each corresponding outer rail 22 and inner rail 26 and are spaced apart vertically along a length of the rails. Beneficially, as the cross-ties 20 are a separate component from the outer rails 22 and the inner rails 26, a desired number of cross-ties 20 can be connected between each corresponding outer rail 22 and inner rail 26 based on design considerations of the intended concrete wall. Similarly, lateral braces 38 are connected between adjacent pairs of outer rails 22 and/or between adjacent pairs of inner rails 26. A plurality of lateral braces 38 are connected between adjacent pairs of outer rails 22 and/or between adjacent pairs of inner rails 26 and are spaced apart vertically along a length of the rails. A desired number of lateral braces 38 can attached between adjacent pairs of outer rails 22 and/or between adjacent pairs of inner rails 26 based on design considerations of the form system 210.

Figure 9:
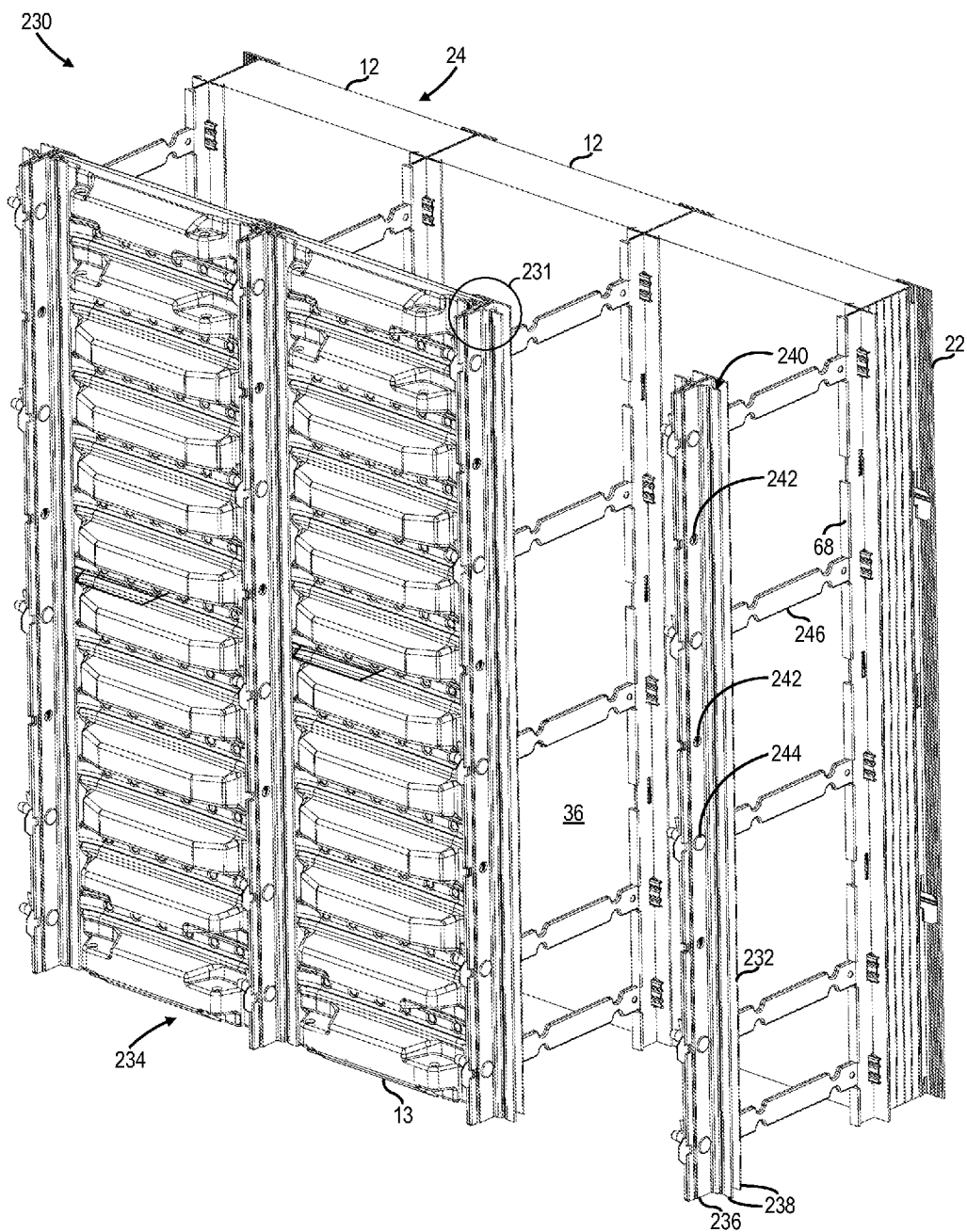
FIG. 9 is an exploded perspective view of a vertically oriented building form system including removable support panels according to an embodiment of the invention.

Referring now to FIG. 9, a form system 230 is shown according to an embodiment of the invention, in which elements of the form system are removable upon pouring and setting of the concrete wall. That is, form system 230 is designed as a reusable concrete form in which all or a portion of the components therein are removable after pouring and setting of the concrete wall. According to the embodiment of FIG. 9, the form system 230 includes a plurality of outer rails 22 that align insulating panels 12 to form an outer panel wall 24 and a plurality of inner rails 232 that align support panels 13 to form an inner wall 234.

Figure 9A:
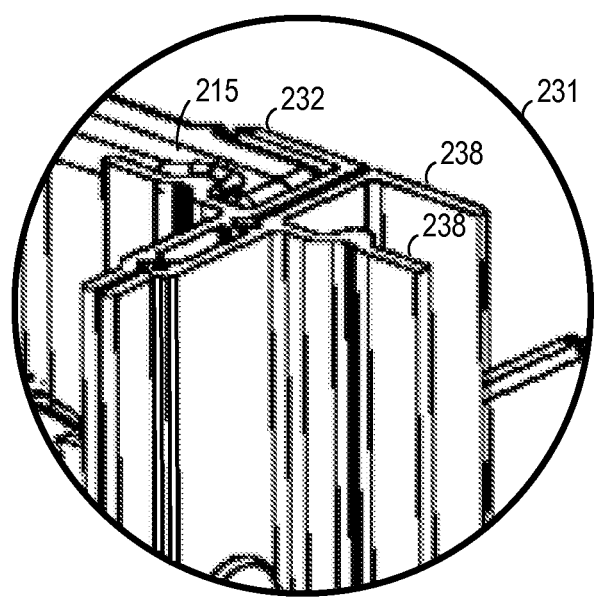
FIG. 9A is a detailed view of a portion of the vertically oriented building form system of FIG. 9.

As shown in FIG. 9, inner rails 232 are formed to have an L-shape and include a center wall 236 and a pair of flanges 238 extending therefrom. The flanges 238 define a support channel 240 configured to receive support panels 13. According to an exemplary embodiment, at least one of the flanges 238 has a curved orientation that is configured to lock/secure a support panel 13 to inner rail 232 when slid into channel 240, as is shown in the enlarged view of a portion 231 of inner rail 232 and support panel 13 provided in FIG. 9A. Specifically, the curved orientation of one (or both) of flanges 238 is configured to mate with a curved surface of attachment section 215 to secure support panel 13 within support channel 240 (see FIG. 9A), only allowing for removal of the support panel 13 from the support channel 240 by vertically sliding the support panel out from the support channel. (emphasis added)

As further shown in FIG. 9, center wall 236 of inner rail 232 includes therein a plurality of pin openings 242 vertically spaced along a length of the inner rail. Pin openings 242 are configured to receive locking pins 244 therein to secure adjacent inner rails 232 to one another and also to secure cross-ties 246 to the inner rails, as will be explained further below.

To form inner panel wall 234, a plurality of support panels 13 is placed into channels 240 defined in inner rails 26. A support panel 13 is inserted into channel 240 between adjacent pairs of inner rails 232 to form inner panel wall 234. As shown in FIG. 9, a pair of L-shaped inner rails 232 are placed back-to-back between each adjacent pair of support panels 13, such that channels 240 formed by flanges 238 of the inner rails are oriented in opposing directions. The pair of L-shaped inner rails 232 are then secured to one another by way of inserting locking pin 244 through matching pin openings 242 of the inner rails 232.

To provide structural integrity to form system 230 during pouring of a wall, each of the outer rails 22 and the inner rails 232 is configured to receive and mate with cross-ties 246. The cross-ties 246 are connected between the outer rails 22 and the inner rails 232 at ninety degree angles to retain the outer and inner rails, as well as the insulating panels 12 and support panels 13, in a spaced-apart relationship to allow flow of concrete between the insulating panels and support panels. A plurality of cross-ties 246 are connected between each corresponding outer rail 22 and inner rail 232 and are spaced apart vertically along a length of the rails. Beneficially, as the cross-ties 246 are a separate component from the outer rails 22 and the inner rails 232, a desired number of cross-ties 246 can be connected between each corresponding outer rail 22 and inner rail 232 based on design considerations of the intended concrete wall.

Figure 10:
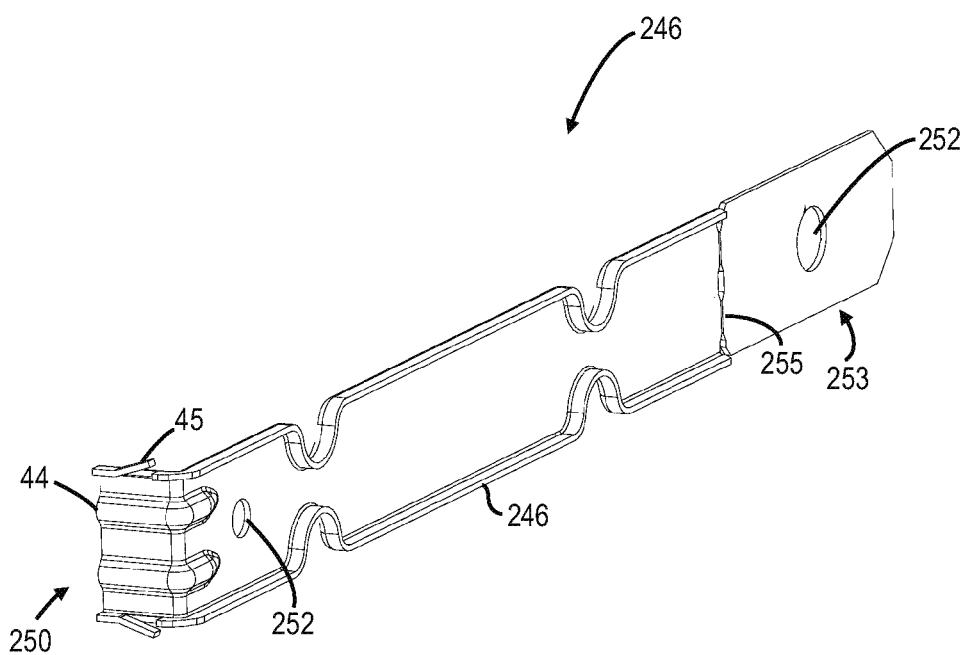
FIG. 10 is a detailed view of a cross-tie for use with the form system of FIG. 9.

Referring to FIG. 10, and with continued reference to FIG. 9, a detailed view of cross-tie 246 is shown in FIG. 10 according to an embodiment of the invention. Cross-tie 246 is formed of steel and includes a body length 248 and an end section 250 formed on one side of the body length extending out at a right-angle therefrom. According to an exemplary embodiment, an end cap 44 is slid over end section 250 and includes thereon spring tabs 45 configured to mate with attachment brackets 68 of outer rail 22. At an end of body length 248 opposite from end section 250, a pin opening 252 is formed in body length 248 configured to receive locking pin 244. According to one embodiment, a pin opening 252 is also formed in body length 248 proximate to end section 250 and is also configured to receive a locking pin 244 therein, such that embodiments of the form system 230 may be implemented where L-shaped rails identical to inner rails 232 are also used as outer rails, as will be explained further below. As shown in FIG. 10, a portion 253 of body length 248 is removable from cross-tie 246. A frangible or weakened break line 255 separates the removable portion 253 from the remainder of body length 248 and provides for easy removal of the removable portion 253.

Figure 11:
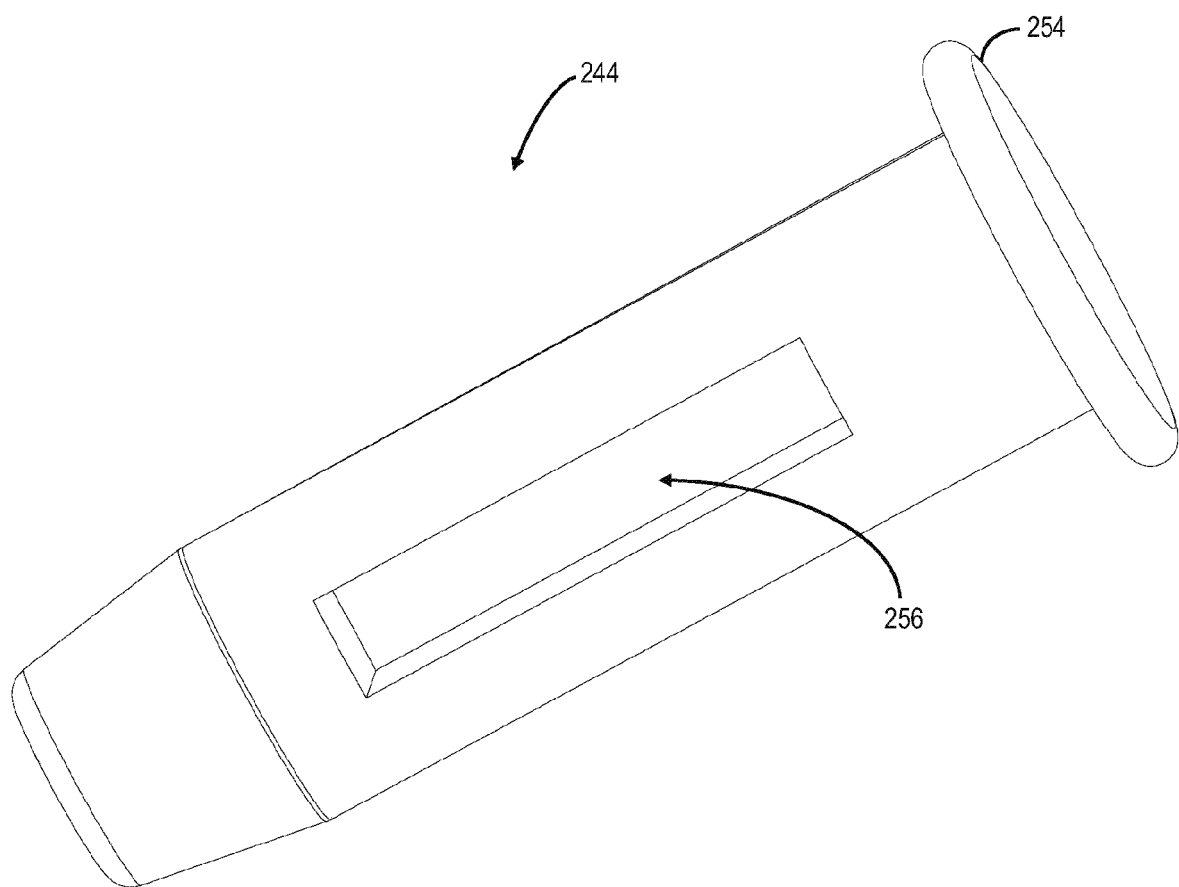
FIG. 11 is a detailed view of a locking pin for use with the form system of FIG. 9.

Referring again to FIG. 9, in securing cross-ties 246 to the inner rails 232, cross-ties 246 are positioned between a pair of back-to-back facing inner rails 232. The pin openings 252 in cross-ties 246 are aligned with pin openings 242 in inner rails 232 and locking pins 244 are inserted through the pin openings 242, 252 in both the cross-ties 246 and the inner rails 232. As shown in FIG. 11, according to one embodiment, locking pin 244 includes a head 254 on one end larger than pin openings 242, 252 and also includes a slot 256 formed therethrough to receive an insert (not shown), the combination of which secures the pair of back-to-back inner rails 232 and the cross-tie 246 between the pair of back-to-back inner rails 232, as shown in FIG. 9.

Upon assembly of form system 230, concrete is poured into cavity 36. According to an embodiment of the invention, it is recognized that support panel 13 can include therein a door therein (not shown) that can be selectively opened to provide for a "side pour" of concrete or other hardenable material into cavity 36, such as shown and described in the form system 210 of FIG. 8. According to another embodiment of the invention, support panels 13 are configured to include a pattern (not shown) on one side thereof. That is, the side of support panels 13 facing into cavity 36 can include thereon one of any number of patterns, such as a brick-like pattern for example, that functions to pattern an interior surface of a wall formed by the poured concrete.

Upon setting of the concrete, inner rails 232 and support panels 13 can be removed to expose the concrete wall. Support panels 13 are first removed (i.e., slid out) from channels 240 of inner rails 232. Locking pins 244 are then removed from pin openings 242, 252 of the inner rails 232 and cross-ties 246, thus allowing for subsequent removal of the inner rails 232. Upon removal of inner rails 232, portion 253 (FIG. 10) of cross-ties 246 extending out from the set concrete wall can then be snapped off to present a smooth/patterned wall surface.

While form system 230 of FIG. 9 is shown as including outer rails 22 configured to receive insulating panels 12 to form an outer panel wall 24, it is recognized that embodiments of form system 230 could include outer rails constructed identical to inner rails 232 to receive support panels 13 therein, so as to define a cavity 36 for pouring the concrete wall. That is, when it is desired to form a wall without any insulation panels 12 on either side of the wall, L-shaped rails such as described above for the inner rails 232 could also be used as "outer rails." Cross-ties 246 could still be used in such an embodiment, as pin openings 252 (FIG. 10) are formed on each end of the cross-tie 246, thus allowing for L-shaped rails to be used for both the inner rails and the "outer rails" that provide for mating to the cross-ties 246.

Therefore, according to one embodiment of the invention, a system for forming a wall structure includes a plurality of pairs of opposing vertical forming panels spaced from each other to define a forming cavity disposed to receive a hardenable material, wherein each pair of opposing forming panels comprises an inner panel forming part of an inner wall and an outer panel forming part of an outer wall. The system also includes an outer rail positioned between each adjacent pair of outer forming panels and an inner rail positioned between each adjacent pair of inner forming panels. The inner forming panels comprise support panels configured to be selectively addable and removable from between each adjacent pair of inner rails prior to and subsequent to a pouring of the hardenable material into the cavity.

According to another embodiment of the invention, a vertical form system includes a plurality of pairs of opposing vertical forming panels spaced from each other to define a forming cavity disposed to receive a hardenable material, wherein each pair of opposing forming panels comprises an inner panel forming part of an inner wall and an outer panel forming part of an outer wall. The vertical form system also includes an outer rail positioned between each adjacent pair of outer forming panels and an inner rail positioned between each adjacent pair of inner forming panels. The inner forming panels comprise support panels, with each of the support panels having a center reinforcement section and an attachment section formed on each side of the center reinforcement section. The attachment sections are configured to selectively mate with the inner rail such that the support panel can be selectively added to and removed from the inner rail.

According to yet another embodiment of the invention, a system for forming a wall structure includes a plurality of pairs of opposing vertical forming panels spaced from each other to define a forming cavity disposed to receive a hardenable material, wherein each pair of opposing forming panels comprises an inner panel forming part of an inner wall and an outer panel forming part of an outer wall. The system also includes an outer rail positioned between each adjacent pair of outer forming panels, with the outer rail having a center wall and a plurality of flanges extending outwardly from the center wall to define a pair of panel channels. The system further includes an inner rail positioned between each adjacent pair of inner forming panels, the inner rail having a center wall and a plurality of flanges extending outwardly from the center wall to define a pair of panel channels and to define a support channel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for forming a wall structure comprising:
a plurality of pairs of opposing vertical forming panels spaced from each other to define a forming cavity disposed to receive a hardenable material, wherein each pair of opposing forming panels comprises an inner panel forming part of an inner wall and an outer panel forming part of an outer wall;
a vertically oriented outer rail positioned between each adjacent pair of outer forming panels; and
a vertically oriented inner rail positioned between each adjacent pair of inner forming panels;
wherein the inner forming panels comprise support panels configured to slidingly engage the inner rails so as to be selectively addable and removable from between each adjacent pair of inner rails prior to and subsequent to a pouring of the hardenable material into the cavity;

wherein the inner rail comprises a center wall and a pair of flanges extending outwardly from the center wall to define a support channel configured to receive the support panel; and wherein at least one of the pair of flanges defining the support channel comprises a curved flange configured to mate with a curved attachment section of the support panel, thereby securing the support panel within the support channel.

2. The system of claim 1 wherein the support panel comprises:

a center reinforcement section; and an attachment section formed on each side of the center reinforcement section, the attachment sections configured to slidingly engage with the inner rail such that the support panel can be selectively added and removed from the inner rail prior to and subsequent to a pouring of the hardenable material into the cavity.

3. The system of claim 2 wherein the center reinforcement section includes an opening formed therethrough and further comprises a door positioned in the opening, the door including a hinge thereon to selectively open and close the door to expose the opening.

4. The system of claim 2 wherein the center reinforcement section comprises a hollow plastic outer body and a filler material within the hollow plastic outer body.

5. The system of claim 1 wherein the inner rail positioned between each adjacent pair of inner forming panels comprises a first tie rail and a second tie rail, the first and second tie rails arranged back-to-back such that the pair of flanges on each of the first tie rail and the second tie-rail extend out in opposite directions.

6. The system of claim 1 wherein the inner rail comprises a center wall and a plurality of flanges extending outwardly from the center wall to define a pair of panel channels and to define a support channel configured to receive the support panel.

7. The system of claim 6 wherein the inner forming panels comprise at least one of insulation panels configured to be received in the panel channels and support panels configured be to selectively addable and removable from the support channel.

8. The system of claim 6 wherein the inner rail includes a plurality of electrical chases formed through the center wall in the support channel.

9. The system of claim 1 wherein the outer rail comprises a center wall and a plurality of flanges extending outwardly from the center wall to define a pair of panel channels; and wherein the outer forming panels comprise insulating panels configured to be insertable within the panel channels of the outer rail.

10. The system of claim 9 wherein the inner rail comprises a center wall and a plurality of flanges extending outwardly from the center wall to define a pair of panel channels and to define a support channel configured to receive the support panel; and wherein the panel channels defined by the outer rail have a width that is greater than a width of the panel channels defined by the inner rail.

11. The system of claim 1 wherein the outer rail comprises a center wall and a pair of flanges extending outwardly from the center wall to define a support channel; and wherein the outer forming panels comprise support panels insertable within the support channel of the outer rail, the support panels configured to be selectively added and removed from the support channel prior to and subsequent to a pouring of the hardenable material into the cavity.

12. A vertical form system comprising:

a plurality of pairs of opposing vertical forming panels spaced from each other to define a forming cavity disposed to receive a hardenable material, wherein each pair of opposing forming panels comprises an inner panel forming part of an inner wall and an outer panel forming part of an outer wall;

an outer rail positioned between each adjacent pair of outer forming panels; and an inner rail positioned between each adjacent pair of inner forming panels;

wherein the inner forming panels comprise support panels, each of the support panels comprising:

a center reinforcement section; and an attachment section formed on each side of the center reinforcement section, the attachment sections configured to selectively mate with the inner rail such that the support panel can be selectively added to and removed from the inner rail;

wherein the center reinforcement section has a thickness that is greater than a thickness of the attachment sections so as to provide increased rigidity in the support panel for pouring of the hardenable material into the forming cavity of the form system; and wherein the center reinforcement section comprises a hollow plastic outer body and a filler material within the hollow plastic outer body.

13. The vertical form system of claim 12 wherein the center reinforcement section includes an opening formed therethrough and further comprises a door positioned in the opening, the door including a hinge thereon to selectively open and close the door to expose the opening.

14. The vertical form system of claim 12 wherein the inner rail comprises a center wall and a pair of flanges extending outwardly from the center wall to define a support channel, the support channel configured to slidingly receive the attachment section of the support panel therein and allow for the selective addition and removal of the support panel from the inner rail.

15. The vertical form system of claim 14 wherein at least one of the pair of flanges of the inner rail has a curved orientation; and wherein each attachment section of the support panel has a curved orientation configured to interlock with the at least one curved flange of the inner rail to secure the support panel within the support channel of the inner rail.

16. The vertical form system of claim 12 wherein the inner rail comprises a center wall and a plurality of flanges extending outwardly from the center wall to define a pair of panel channels and to define a support channel; and wherein the inner forming panels comprise at least one of an insulation panels configured to be received in the panel channel and a support panel configured be to selectively addable and removable from the support channel.

17. A system for forming a wall structure comprising:

a plurality of pairs of opposing vertical forming panels spaced from each other to define a forming cavity disposed to receive a hardenable material, wherein each pair of opposing forming panels comprises an inner panel forming part of an inner wall and an outer panel forming part of an outer wall;

an outer rail positioned between each adjacent pair of outer forming panels, the outer rail comprising a center wall and a plurality of flanges extending outwardly from the center wall to define a pair of panel channels; and an inner rail positioned between each adjacent pair of inner forming panels, the inner rail comprising:
- a center wall; and
- a plurality of flanges extending outwardly from the center wall to define a pair of panel channels and to define a support channel;
- wherein the support channel and each of the pair of panels channels on the inner rail comprises a u-shaped channel that is formed by a portion of the center wall and a pair of respective flanges from the plurality of flanges.

18. The system of claim 17 wherein the inner forming panels comprise support panels slidingly insertable within the support channel of the inner rail, and wherein the support panels are configured to be selectively added and removed from the support channel prior to and subsequent to pouring of the hardenable material.

19. The system of claim 18 wherein the support panel includes an opening formed therethrough and further comprises a door positioned in the opening, the door including a hinge thereon to selectively open and close the door to expose the opening.

20. The system of claim 17 wherein the inner forming panels comprise insulating panels insertable within the panel channels of each adjacent pair of inner rails.

21. The system of claim 17 wherein the panel channels defined by the outer rail have a width that is greater than a width of the panel channels defined by the inner rail.

22. The system of claim 17 wherein the inner rail includes a plurality of electrical chases formed through the center wall in the support channel.

23. A system for forming a wall structure comprising:
- a plurality of pairs of opposing vertical forming panels spaced from each other to define a forming cavity disposed to receive a hardenable material, wherein each pair of opposing forming panels comprises an inner panel forming part of an inner wall and an outer panel forming part of an outer wall;
- a vertically oriented outer rail positioned between each adjacent pair of outer forming panels; and
- a vertically oriented inner rail positioned between each adjacent pair of inner forming panels;
- wherein the inner forming panels comprise support panels configured to slidingly engage the inner rails so as to be selectively addable and removable from between each adjacent pair of inner rails prior to and subsequent to a pouring of the hardenable material into the cavity; and
- wherein the inner rail positioned between each adjacent pair of inner forming panels comprises a first tie rail and a second tie rail each having a center wall and a pair of flanges extending outwardly from the center wall to define a support channel configured to receive the support panel, the first and second tie rails arranged back-to-back such that the pair of flanges on each of the first tie rail and the second tie-rail extend out in opposite directions.

\* \* \* \* \*